Patented Mar. 14, 1939

2,150,547

UNITED STATES PATENT OFFICE 2,150,547

DEWAXING MINERAL OIL

Waldersee B. Hendrey and Edwin C. Knowles, Beacon, N. Y., assignors to The Texas Company, New York, N. Y., a corporation of Delaware No Drawing. Application November 18, 1935
Serial No. 50,410

4 Claims. (Cl. 196—18).

This invention relates to the separation of wax from oil.

The invention contemplates a process for dewaxing wax-bearing mineral oil in the presence of a solvent or diluent liquid in which a wax crystal modifying substance, comprising a metal soap of a fatty acid, or a mixture of such soap with montan wax, is added to the oil, or to a mixture of the oil and dewaxing solvent. The resulting mixture of oil, modifying substance and solvent is then heated to an elevated temperature prior to chilling. Thereafter, the mixture is chilled to precipitate the wax constituents, and the wax constituents thus precipitated are separated from the cold mixture by filtration, centrifuging or settling.

The present application relates to a modification of the process disclosed in pending application, Serial No. 41,393, filed September 20, 1935, in the name of Edwin C. Knowles, one of the present joint applicants, for Dewaxing mineral oil.

In the above mentioned pending application there is disclosed a novel process of dewaxing in which the wax-bearing oil and dewaxing solvent liquid is heated to a temperature of 15° to 50° F. above the minimum temperature at which the wax and oil apepars to be in complete solution in the solvent prior to chilling. Thereafter, the heated mixture is chilled to precipitate the wax, and the precipitated wax separated by mechanical means.

As disclosed in this pending application, the process is particularly adapted to the dewaxing of wax-bearing oil which contains either naturally-occurring or added wax crystal modifying substances. It has been found that heating the mixture of such oil and solvent to a temperature substantially above the minimum temperature of apparent complete solution exerts a beneficial effect upon the crystalline structure of the wax precipitated upon chilling the mixture so that the wax is more readily separated and can be more rapidly filtered, centrifuged or settled therefrom.

It is thought that the wax crystal modifying substance is less soluble than wax in the dewaxing solvent liquid, and at the minimum temperature at which the wax appears to be dissolved in the solvent as, for example, temperatures of around 100° to 125° F. the modifying substance is not in true solution but is present as a colloidal solution.

When present in the form of a colloidal solution, it is thought that the modifying substance is ineffective in promoting separation of the wax crystals in an easily separable form.

It is believed that upon heating the mixture of wax-bearing oil and solvent to temperatures in the range 125° to 175° F. this wax crystal modifying substance is completely dissolved in the solvent. Upon chilling the thus heated solution, this modifying substance precipitates therefrom substantially co-extensively with the wax in the form of nuclear particles which facilitate crystallization of wax in a more readily separable form. It is thought that the optimum effect is realized when the modifying substance continues to precipitate from the solution over the entire range of wax crystallization.

It has been discovered that greatly improved results are obtained with the addition of wax crystal modifying substances to the wax-bearing oil where the oil, modifying substance, and dewaxing solvent, is heated to elevated temperatures prior to chilling.

The present invention concerns a specific modification of the broad invention disclosed in the pending application above referred to, and involves dewaxing in the presence of added wax crystal modifying substances of a saponaceous character. Modifying materials which have been found suitable for this purpose comprise metal soaps of the higher fatty acids, such as aluminum stearate, lead stearate, and magnesium soap, consisting mainly of a mixture of magnesium stearate and magnesium palmitate. Metal soaps of naphthenic acids, such as aluminum naphthenate and lead naphthenate, may be used. Mixtures of these metal soaps with montan wax have also been found suitable, as, for example, a mixture consisting of about 0.25% aluminum stearate and 0.03% montan wax. As disclosed in the related copending application, Serial No. 50,408, filed by one of the present joint applicants, crude montan wax has been found satisfactory as a wax crystal modifying material.

These materials may be added to the oil in the proportion of from about 0.1% to about 1.0% by weight of the wax-bearing oil. A relatively small amount of the material is required as, for example, around 0.25%, and not in excess of about 0.5%, is usually sufficinet.

The invention is particularly adapted to the dewaxing of low viscosity oils as, for example, wax-bearing oils having a Saybolt Universal viscosity up to about 75 seconds at 210° F. Higher viscosity oils having a viscosity of about 80 seconds at 210° F. appear to contain naturally-occurring asphaltic constituents which partake of the nature of wax crystal modifying substances when the oil is subjected to the preliminiary heating step above described.

However, in certain instances, it has been found advantageous to add a small amount of wax crystal modifying material to these relatively viscous oils, and thereby improve the results obtained in the dewaxing operation.

The above mentioned wax crystal modifying material may be incorporated in the wax-bearing oil, either before or after mixing, with the dewaxing solvent. It may also be incorporated in the form of a gel made by mixing the material with some low viscosity lubricating oil at elevated temperature.

The mixture of oil, modifying material and solvent is advantageously heated to a temperature of around 160° or 170° F. Somewhat lower or higher temperatures may be employed within the range about 125° to 190° F., or at a temperature of about 15° to 90° F. above the minimum temperature of apparent complete solution. The temperature selected will depend upon the nature of the oil and also upon the solvent. With a selective type of solvent, consisting of a mixture of 35% acetone and 65% benzol, a suitable temperature will be in the range 125° to 175° F., while with a petroleum diluent type of solvent, such as pentane, the temperature will be in the range 140° to 190° F.

In order to further illustrate the invention, reference will now be made to the following experiments in which different wax distillate fractions, having the following characteristics, were dewaxed. These distillate fractions were each obtained from a Mid-Continent crude, and first subjected to solvent refining with furfural to remove relatively low viscosity index constituents.

|  | Distillate "A" | Distillate "B" | Distillate "C" |
|---|---|---|---|
| Gravity, °A. P. I. | 30.5 | 28.3 | 26.9 |
| Flash, °F | 430 | 500 | 570 |
| Fire, °F | 485 | 580 | 645 |
| S. U. vis. @ 210° F | 49.0 | 69.5 | 111.5 |
| Pour, °F | +100 | +115 | +120 |
| Percent paraffin | 9.6 | 10.4 | 11.5 |
| M. P. of paraffin, °F | 131.5 | 145.5 | 143.5 |

In each instance, these fractions were dewaxed with a solvent consisting of 50% methyl ethyl ketone and 50% isopropyl ether. The ratio of solvent mixture to oil was varied in certain instances, as indicated below. In making each run, the modifying substance was added to the mixture of oil and solvent, then heated to the temperature shown prior to chilling. Thereafter, the mixture was chilled to about 0° F. and filtered at that temperature, producing a filtrate which, after removal of the solvent, had a pour test of around +10° F.

The chilling and filtering steps were carried out in apparatus and in a manner similar to that described in the pending application, above referred to. During the chilling step, the mixture was subjected to relatively mild agitation by bubbling inert gas through it. The filter cake obtained in each case was not subjected to washing.

The filter rate indicated in each instance is in gallons of wax-free oil per square foot of filtering surface per hour, calculated on the time required to filter equal volumes, namely, 0.20 gallons per square foot of filter surface.

| Percent montan wax | Percent aluminum stearate | Heating temp., °F. | Filter rate | Percent yield wax-free oil | Percent paraffin in slack wax |
|---|---|---|---|---|---|
| *Distillate "A" using 4 parts of solvent to 1 part of oil* | | | | | |
| 0.0 | 0.0 | 170 | 29 | 62 | 27.5 |
| 0.04 | 0.25 | 170 | 240 | 82 | 61.0 |
| *Distillate "B" using 4 parts of solvent to 1 part of oil* | | | | | |
| 0.0 | 0.0 | 170 | 11 | 56 | 28.5 |
| 0.23 | 0.0 | 165 | 46 | 78 | 51.5 |
| 0.23 | 0.0 | 115 | 15.6 | 66 | 30.5 |
| 0.0 | 0.25 | 170 | 60 | 75 | 41.5 |
| 0.0 | 0.23 | 113 | 4.5 | 53 | 26.0 |
| 0.08 | 0.25 | 165 | 104 | 83 | 68.5 |
| *Distillate "B" using 1.5 parts of solvent to 1 part of oil* | | | | | |
| 0.03 | 0.25 | 170 | 46 | 80 | 65 |
| *Distillate "B" using 1 part of solvent to 1 part of oil* | | | | | |
| 0.03 | 0.25 | 170 | 21 | 79 | 65 |
| *Distillate "C" using 4 parts of solvent to 1 part of oil* | | | | | |
| 0.0 | 0.0 | 170 | 63 | 75 | 52 |
| 0.04 | 0.25 | 170 | 98 | 81 | 77 |

The two runs on distillate "A", which was an oil of 49 seconds at 210° F. viscosity, were made at the same temperature. The first run was made without any wax crystal modifying substance, while the second run was made after having added 0.04% of montan wax and 0.25% of aluminum stearate by weight of the wax-bearing oil.

As shown, the presence of the modifying substance resulted in a very marked increase in the filter rate, and also marked increases in the yield of wax-free oil and of paraffin in the filter cake of slack wax.

With reference to distillate "B", which was an oil having a viscosity of 69 seconds at 210° F., the runs made with 0.23% of montan wax and aluminum stearate, respectively, at temperatures of 113° and 115° F., gave relatively low filter rates, namely, 4.5 and 15.6 gallons of wax-free oil per square foot of filtering surface per hour. The yields of wax-free oil and paraffin in the slack wax were also correspondingly low. Likewise, the data indicate that heating the mixture of this oil and solvent to a temperature of 170° F., without the addition of either montan wax or aluminum stearate, resulted in a relatively low filter rate, namely, 11 gallons with correspondingly low yields.

However, as shown by the foregoing data, heating the mixture, to which small amounts of either montan wax or aluminum stearate has been added, results in a very substantial improvement in the filter rate, the rates being 46 to 60 gallons per square foot of filtering surface per hour with correspondingly higher yields.

It is also to be observed that a comparatively high filter rate, with correspondingly high yields, was obtained in the run in which the wax crystal modifying substance consisted of a mixture of 0.08% montan wax and 0.25% aluminum stearate by weight of the wax-bearing oil. In this run, a filter rate of 104 gallons was obtained, yielding 83% of wax-free oil. The percent paraffin in the filter cake was 68.5. These tests indicate that the results obtained with a mixture of montan wax and aluminum stearate are superior to those obtained with montan wax and aluminum stearate individually.

With reference to the runs on distillate "C", it will be observed that, even in the case of relatively viscous oil, the addition of the modifying substance, followed by heating, resulted in substantial improvement in filter rates and yields.

The following tabulation affords a comparison of the results obtained in dewaxing distillate "B" with a solvent of the same composition, using four parts of the solvent to one part of oil, and adding to the mixture 0.04% montan wax and 0.25% of one of the several metal soaps indicated below, by weight of the wax-bearing oil. In each instance, the mixture was heated to a temperature of 170° F. prior to chilling, and then chilled to a temperature of 0° F. in the manner above described. The chilled mixture was then filtered at this temperature, producing a filtrate which, after removal of the solvent, had a pour test of around +10° F.

| Soap | Filter rate | Yield of waxfree oil | Percent paraffin in the slack wax |
|---|---|---|---|
| Aluminum stearate | 60 | 75 | 41.5 |
| Lead stearate | 50 | 80 | 58.5 |
| Mixture of magnesium stearate and palmitate | 63 | 82 | 60.5 |
| Aluminum naphthenate | 12 | 73 | 40.5 |
| Lead naphthenate | 29 | 69 | 38.5 |

The foregoing data indicate that each of these soaps provided satisfactory wax crystal modifying materials, the results in all cases being superior to those reported in the blank run on this same stock in the preceding tabulation.

The invention is applicable to dewaxing with different dewaxing solvents, either selective solvents, such as a mixture of acetone and benzol, or a diluent type of solvent, such as naphtha, or a relatively low-boiling petroleum fraction.

Suitable selective solvents may comprise aliphatic ketones, such as acetone and methyl ethyl ketone mixed with benzol and its homologs; mixtures of a low molecular weight ketone and a high molecular weight ketone such as methyl ethyl ketone and dipropyl ketone; a mixture of an aliphatic ether and an aliphatic ketone, such as that used in the specific examples described above; petroleum fractions suitable as solvents may comprise hydrocarbons, such as propane, butane, pentane, etc., up to nonane or mixtures thereof. Petroleum fractions as solvents may be used, alone or in conjunction with a wax antisolvent liquid, such as acetone and methyl ethyl ketone.

The ratio of dewaxing solvent to wax-bearing oil may vary from that shown above, as for example, from one to six parts of solvent to one part of oil may be used, if desired. I have found that excellent results are obtained with comparatively low ratios, that is, from one to two parts of solvent to one part of oil. Moreover, with these low ratios, superior results are, in many instances, obtained by the process of our invention as compared to those realized by prior art methods when using higher dilution ratios.

Furthermore, the invention is applicable to the dewaxing of residual, as well as distillate, wax-bearing petroleum fractions. While it is particularly adapted to the dewaxing of oils having a viscosity of below 80 seconds at 210° F., nevertheless, as already indicated, it may be applied advantageously in the case of more viscous oils.

Obviously, many modifications and variations of the invention, as hereinbefore set forth, may be made without departing from the spirit and scope thereof, and therefore only such limitations should be imposed as are indicated in the appended claims.

We claim:

1. In the dewaxing of viscous wax-bearing mineral lubricating oil having a relatively large content of low and high melting point wax by filtration in the presence of an oil soluble polyvalent metallic soap of an organic acid effective as a wax crystal regulator, the method comprising mixing the oil with a dewaxing solvent, incorporating in the mixture said soap and a small amount of montan wax such that upon heating the mixture to a temperature above 150° F. to condition it, and chilling the heated mixture to 0° F. to precipitate the wax, the crystal structure of the wax precipitating over substantially the entire range of wax crystallization is beneficially modified, heating said mixture to the aforesaid conditioning temperature, chilling the heated mixture to precipitate the wax, and filtering the chilled mixture to remove the wax so precipitated.

2. The method according to claim 1 in which the oil is mixed with a normally liquid dewaxing solvent.

3. In the dewaxing of viscous wax-bearing mineral lubricating oil having a relatively large content of low and high melting point wax by filtration in the presence of an oil soluble polyvalent metallic soap of an organic acid effective as a wax crystal regulator, the method comprising mixing the oil with a solvent having the essential selective action of a mixture of about 35% acetone and 65% benzol, incorporating in the mixture said soap and a small amount of montan wax such that upon heating the mixture to a temperature of around 160° to 170° F. to condition it, and chilling the heated mixture to 0° F. to precipitate the wax, the crystal structure of the wax precipitating over substantially the entire range of wax crystallization is beneficially modified, heating said mixture to the aforesaid conditioning temperature, chilling the heated mixture to precipitate the wax, and filtering the chilled mixture to remove the wax so precipitated.

4. In the dewaxing of wax-bearing mineral lubricating oil having a relatively high content of low and high melting point wax wherein the oil is mixed with a dewaxing solvent and is dewaxed by filtration in the presence of an oil soluble polyvalent metallic soap of an organic acid effective as a wax crystal regulator, the method which comprises incorporating in the oil, in addition to said soap, a small amount of a less soluble wax crystal regulating material comprising montan wax, heating the mixture to a temperature above 150° F. to condition it and thereby beneficially modify crystallization of relatively high melting point wax, chilling the mixture to precipitate the wax and removing the wax so precipitated.

WALDERSEE B. HENDREY.
EDWIN C. KNOWLES.